(12) United States Patent
Blake et al.

(10) Patent No.: US 10,942,775 B2
(45) Date of Patent: Mar. 9, 2021

(54) MODIFIED CENTRAL SERIALIZATION OF REQUESTS IN MULTIPROCESSOR SYSTEMS

(71) Applicant: International Business Machines Corporation, Armonk, NY (US)

(72) Inventors: Michael A. Blake, Wappingers Falls, NY (US); Arun Iyengar, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 81 days.

(21) Appl. No.: 16/289,698

(22) Filed: Mar. 1, 2019

(65) Prior Publication Data

US 2020/0278886 A1 Sep. 3, 2020

(51) Int. Cl.
*G06F 9/50* (2006.01)
*G06F 9/48* (2006.01)

(52) U.S. Cl.
CPC .......... *G06F 9/5027* (2013.01); *G06F 9/4881* (2013.01); *G06F 2209/483* (2013.01); *G06F 2209/503* (2013.01); *G06F 2209/5011* (2013.01)

(58) Field of Classification Search
CPC .................................................. G06F 9/5027
See application file for complete search history.

(56) References Cited

U.S. PATENT DOCUMENTS

| | | | |
|---|---|---|---|
| 5,895,492 A | 4/1999 | Greenspan et al. | |
| 7,149,829 B2 | 12/2006 | Weber et al. | |
| 7,603,502 B2 | 10/2009 | Richter et al. | |
| 7,831,975 B2 | 11/2010 | Ode | |
| 8,316,373 B2 | 11/2012 | Cheng et al. | |
| 8,909,788 B2 | 12/2014 | Heidenreich et al. | |
| 9,009,312 B2 | 4/2015 | Archer et al. | |
| 2015/0234759 A1 | 8/2015 | Tian et al. | |
| 2015/0324234 A1* | 11/2015 | Chang | G06F 9/5033 718/104 |
| 2019/0007280 A1* | 1/2019 | Sarangam | H04L 47/805 |
| 2019/0050255 A1* | 2/2019 | Chagam Reddy | G06F 9/5077 |
| 2020/0042348 A1* | 2/2020 | Acharya | G06F 12/145 |

\* cited by examiner

*Primary Examiner* — Charlie Sun
(74) *Attorney, Agent, or Firm* — Cantor Colburn LLP; William Kinnaman

(57) ABSTRACT

Embodiments includes a computer-implemented method, a system and computer-program product for modifying central serialization of requests in multiprocessor systems. Some embodiments includes receiving an operation requiring resources from a pool of resources, determining an availability of the pool of resources required by the operation, and selecting a queue of a plurality of queues to queue the operation based at least in part on the availability of the pool of resources. Some embodiments also include setting a resource needs register and needs register for the selected queue, and setting a take-two bit for the selected queue.

17 Claims, 5 Drawing Sheets

MODIFIED CENTRAL SERIALIZATION OF REQUESTS IN MULTIPROCESSOR SYSTEMS

BACKGROUND

The present invention generally relates to resource management, and more specifically to modifying the central serialization of requests in multiprocessor systems.

Symmetrical multiprocessor (SMP) computer systems can perform processing of programs by multiple processors that may share a common operating system and memory. They range from coupling individual processors or processor clusters via a single shared system bus, to coupling processors together in a cluster, whereby the clusters communicate using a cluster-to-cluster interface, to a centrally interconnected network where parallel systems built around a large number of processors are interconnected via a central switch, such as a cross-bar switch. If requests for shared resources, such as memory, are not resolved fairly, requests may time-out or large variations in request service time may develop. A request is looped in and out of the pipeline until the targeted resource is available which can delay the processing of the operation. As the number and speed of processors increase, efficient and equitable shared resource coordination is even more desirable. There may be a need to efficiently manage resource allocation while maintaining fairness between different operation types when allocating these resources.

SUMMARY

Embodiments of the present invention are directed to a computer-implemented method for modifying the central serialization of requests in multiprocessor systems. A non-limiting example of the computer-implemented method includes receiving an operation requiring resources from a pool of resources, determining an availability of the pool of resources required by the operation, and selecting a queue of a plurality of queues to queue the operation based at least in part on the availability of the pool of resources. The computer-implemented method also includes setting a resource needs register and needs register for the selected queue, and setting a take-two bit for the selected queue.

Embodiments of the present invention are directed to a system for modifying the central serialization of requests in multiprocessor systems. A non-limiting example of the system includes a storage medium, the storage medium being coupled to a processor. The processor is configured to receive an operation requiring resources from a pool of resources, determine an availability of the pool of resources required by the operation, and select a queue of a plurality of queues to queue the operation based at least in part on the availability of the pool of resources. The processor is also configured to set a resource needs register and needs register for the selected queue, and set a take-two bit for the selected queue.

Embodiments of the invention are directed to a computer program product for modifying the central serialization of requests in multiprocessor systems, the computer program product comprising a computer-readable storage medium having program instructions embodied therewith. The program instructions are executable by a processor to cause the processor to perform a method. A non-limiting example of the method includes receiving an operation requiring resources from a pool of resources, determining an availability of the pool of resources required by the operation, and selecting a queue of a plurality of queues to queue the operation based at least in part on the availability of the pool of resources. The method also includes setting a resource needs register and needs register for the selected queue, and setting a take-two bit for the selected queue.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
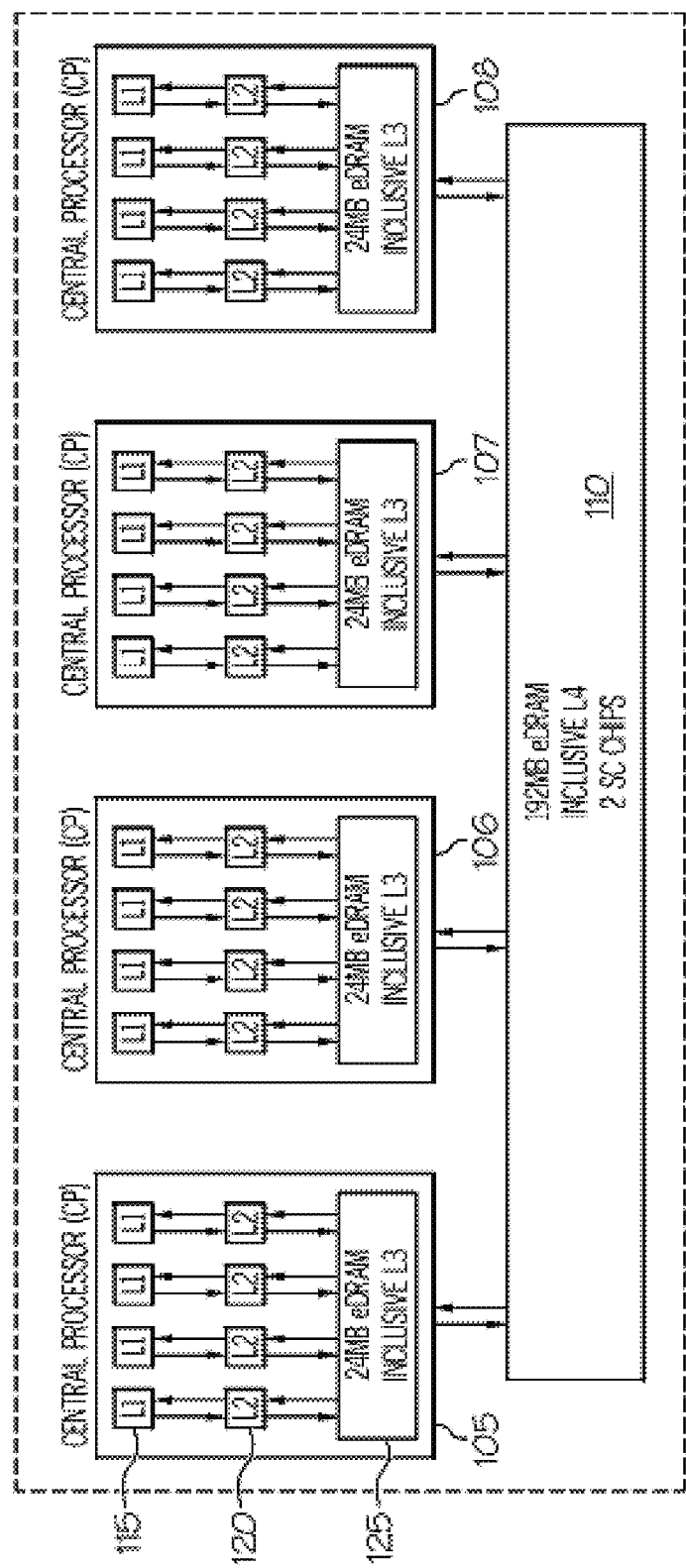
FIG. 1 depicts a block diagram depicting a multiprocessor system in accordance with one or more embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, Storage Controllers are tasked with processing data fetch and store requests to and from main memory from the Processors and I/O Adapters. Since the Storage Controller contains a shared higher level cache, which is architecturally invisible to the software and operating system, the Storage Controller is responsible for performing directory and cache accesses. All incoming requests enter a port on the Storage Controller, where they are received by a Central Processor Request Controller (CFAR) or I/O Request Controller. These controllers generate requests into a Central Priority unit which arbitrates among them and chooses one of the requesters to enter into one of one or more multistage Pipelines based on the address or other operation characteristic. During each stage of the pipeline the requestor may access and/or reserve various resources such as access to the cache, the Local Cache Fetch/Store Controllers, the data path controls, data path first-in-first-out (FIFO) buffers, the Remote Cache Fetch/Store Controllers, etc. As requests exit the pipeline, one of the Local Fetch/Store Controllers may assume responsibility for managing the operation through completion. Often this requires additional passes through the pipeline, which can add delay to the completion of a request.

The introduction of various operation types and priorities can lead to competing queues monopolizing a pool of resources. In one non-limiting example, higher priority operations of one type, such as non-sort operations, can be queued behind a large number of another type, such as sort-type operations, in a fairness queue, which delays when a non-sort operation is allowed to enter the central pipeline and access the limited resource, the resource being a local or remote resource. This can lead to starving one type of operation over another type of operation, such as the higher priority non-sort operation in this example, on being queued in a single queue.

Turning now to an overview of the aspects of the invention, one or more embodiments of the invention address the above-described shortcomings of the prior art by providing multiple fairness queues and a technique to monitor the previous attempts of operations of a particular queue to acquire the resource to ensure that an operation of one type will never need to wait for more than some fixed number of operations of the other type before being allowed access to the resource. For example, a first non-sorted operations queue and a second sorted operations queue. It should be understood that each of the non-sorted and sorted operations can include various priorities within each operation type. That is, the non-sorted operations can include a high, medium, and low priority operation and the sorted operations can also include high, medium, and low priority operation.

The above-described aspects of the invention address the shortcomings of the prior art by tracking the previous unsuccessful attempts to acquire the limited resource(s). Logic is implemented into the storage controller which tracks a queue's previous attempts to acquire the resource to ensure that an operation of one type will not be starved from accessing the resources. In particular, in one embodiment the operation type will not have to wait for more than one operation of the other type before being allowed to access to obtain the resource. This technique ensures that the operation of one type will not be required to wait for more than one operation of the other type before being allowed access to the resource. It is to be understood that the techniques are not limited to waiting for one operation of another type. The take-two latch can be set after a configurable number of failed attempts. That is, any number of failed attempts can be used to initiate the method to avoid starving the current operation type from accessing the resource(s). The number of failed attempts can be configured by an operator/administrator or a default number of failed attempts can be used.

Figure 2:
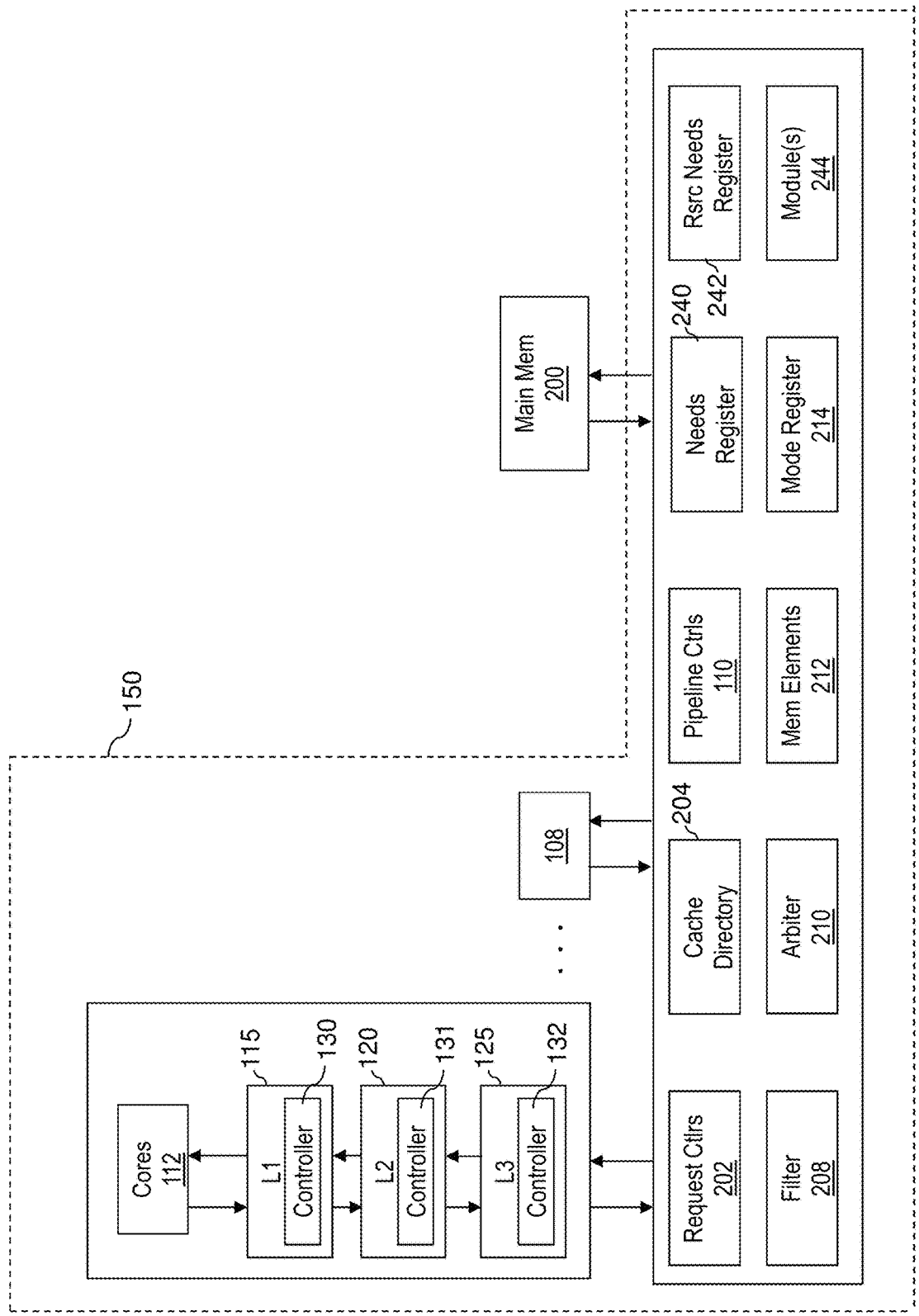
FIG. 2 depicts a block diagram illustrating a processor of the multiprocessor system of FIG. 1.

Turning now to a more detailed description of aspects of the present invention, FIGS. 1 and 2 illustrate a cache topology 100 according to embodiments of the invention. Topology 100 includes a plurality of central processors (CP) (also referred to as central processing units) 105-108 operatively connected via busses to one or more L4 caches 110. Each of the central processors (CP) 105-108 includes one or more cores 112, such as shown in connection with CP 105 in FIG. 2. Core 112 reads and executes instructions passed to topology 100. Each core 112 of each central processor (CP) 105 is operatively connected via busses to corresponding L1 caches 115, L2 caches 120, and an L3 cache 125 that include a corresponding controller 130, 131, and 132. L1 caches 115 are physically closest to the cores 112, next are L2 caches 120, and then L3 caches 125. Although L3 caches 125 and L4 caches 110 may comprise embedded dynamic random access memory (DRAM) which is referred to as eDRAM, it is understood by a skilled artisan that any other types of suitable memory such as SRAM may be utilized. A plurality of central processors 105 operatively connected to L4 caches 110 (e.g., two L4 caches) form a node 150. In a computing system, multiple such nodes 150 may be operatively connected to one another for communicating such as making and responding to requests, as understood by one skilled in the art.

Each individual central processor 105-108 is fabricated on a separate chip that includes the L1 caches 115, L2 caches 120, and L3 caches 125. L4 cache 110 is fabricated on another chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others. In the exemplary embodiment shown central processors 105-108 are operatively connected to a single L4 cache 110. However, it should be understood that exemplary embodiments may include one or more processors connected to one or more L4 caches and multiple memory chips.

In accordance with exemplary embodiments, processors 105-108 exchange data with memory 200 through L4 cache 110. Data exchange takes the form of, for example, requests for access to memory 200. The requests, each having a unique request identifier (ID) may pass from requestors such as L1 caches 115, L2 caches 120, L3 caches 125, cores 112, and other nodes 150 to a resource, also having a unique resource identifier (ID) on L4 cache 110. The requestors may be on the same and/or different central processors 105-108. Requestors may be on the same and/or different nodes 150. Also, the requestor may be any I/O controller (not shown), as understood by one skilled in the art. Each requestor is able to individually request access to a desired resource necessary to process a task on L4 cache 110 through a request controller 202. Resources on the L4 cache may include accessing the cache directory 204, a pipeline controller 110, a filter 208, an arbiter 210, memory elements 212, and a mode register 214. Resources may also include accessing a main memory 200 through L4 cache 110. Also note that although exemplary embodiments depict examples with respect to the L4 cache 110, it is understood that exemplary embodiments are not meant to be limited to operations of the L4 cache 110. For example, the technique discussed herein applies equally to the L3 cache 125 receiving requests from, e.g., the L2 cache 120 and the L4 cache 110. In addition, L3 cache 125 may include the elements shown and described for the L4 cache 110. Also, exemplary embodiments may be implemented in, e.g., main memory 200, external memory (not shown), etc. Furthermore, main memory 200 and external memory may include the elements shown and described for the L4 cache 110. L4 cache 110 is also shown to include a needs register 240 which, as will be discussed more fully below, establishes a desired serialization of requests passing through request controller 202. Also note that although the exemplary embodiment describes a system and method of serializing processor memory requests, it can also be applied for serializing other types of requests that require a shared common resource. In addition, the resource needs register 242 stores a value indicating which resource pool (such as which controller resource is needed) the operation requires access to. It should be understood that other modules can be incorporated into the system to carry out additional tasks.

Figure 3:
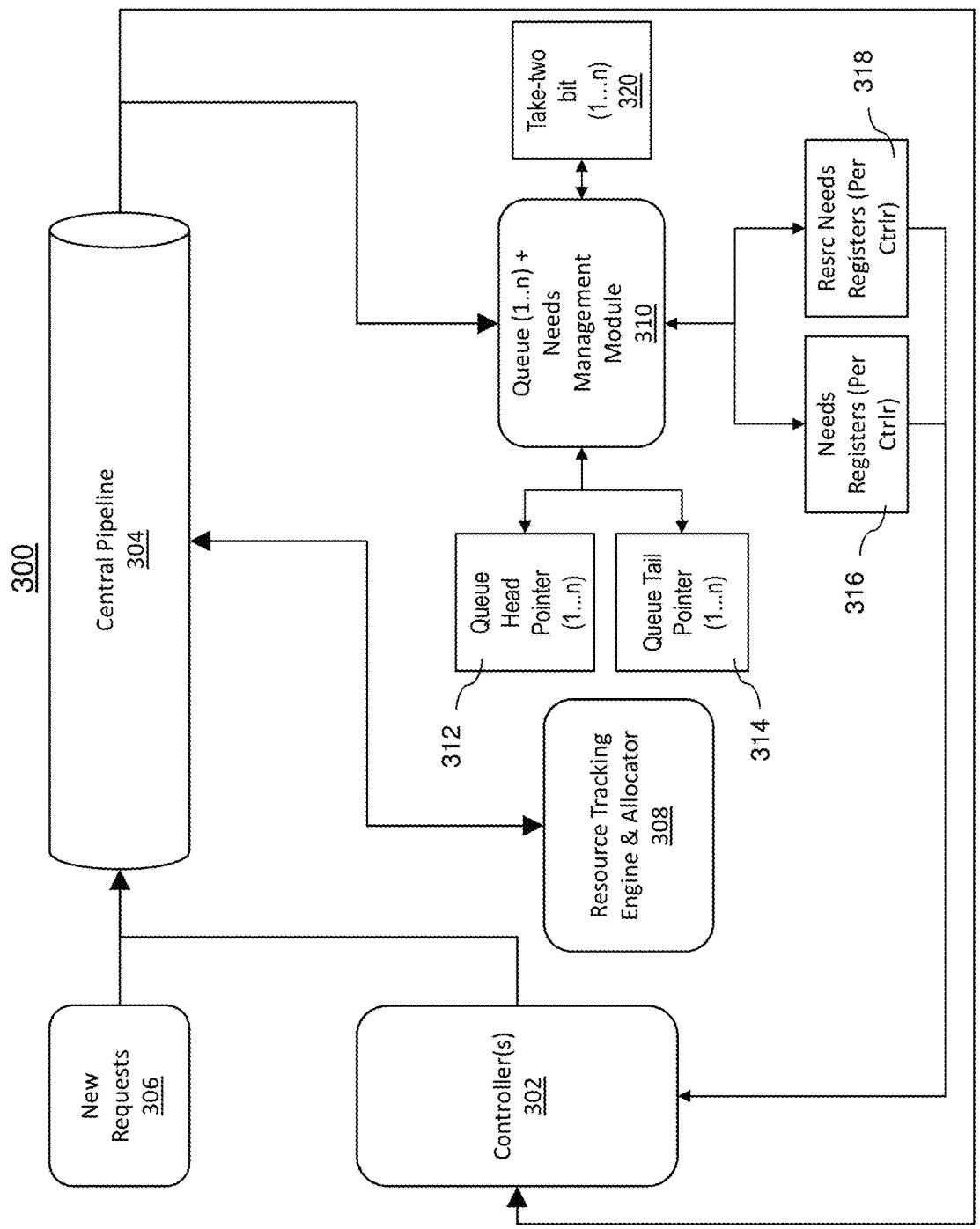
FIG. 3 depicts a block diagram illustrating a storage controller of the multiprocessor system of FIG. 1.

FIG. 3 depicts a system 300 for implementing efficient resource allocation within an SMP broadcast scope maintaining fairness between operation types. It should be understood the engine 308 can be configured to monitor local resources, remote resources, or a combination thereof. The system 300 includes a storage controller such as an L4 shared storage controller 302. The controller 302 is configured to manage storage requests and provide them to the central pipeline 304 for further processing. In one or more embodiments of the invention, the system 300 is configured to snoop the operation or new requests 306 provided to the central pipeline 304. In one or more embodiments, the snooping of the operation and/or requests 306 occurs as it proceeds through the central pipeline.

Resource tracking engine and allocator 308 (hereinafter referred to as the "engine 308") is configured to maintain a count of the available remote resources. The engine 308 can track the number of remote resources that are used and the resources as the resource are freed and made available. The engine 308 that is coupled to the central pipeline 304 is configured to send signals to the allocator regarding certain characteristics of both the resource being tracked and of the operation in the Central Pipeline 304. The queue needs management module 310 is configured to communicate with one or more components of the system 300 to control the allocation of the resources for each received operation. The queue head pointer 312 maintains a location of the head of the queue and updates the pointer as the data in the queue(s) is added and/or removed. The queue tail pointer 314 maintains a location of the end of the queue and updates the pointer as the data in the queue(s) is added and/or removed.

The queue management needs module 316 is coupled to the need registers 316 and resource needs registers 318. The needs register 316 indicates a head of the queue or a controller ID for an operation that is associated with one or more queues. The resource needs register 318 indicates a particular pool or set of resources that are requested for an operation. The output of the needs register 316 and the resource needs registers 318 is provided to the controller 302 and determines which queued operation and/or request is provided to the central pipeline 304. The needs register 316 can store an encoded value indicating whether this controller's operation is next to be given access (head of queue) or which other controller this controller needs to wait behind in line. The value indicated in the needs register is the "head" codepoint or the "controller ID" that was previously tail of the queue for the rejected operation. In addition, the resources needs registers 318 stores a value indicating which resource pool (such as which controller resource is needed) the operation requires access to. The needs register sets a needs switch and a resource needs switch for the new storage request. The needs switch identifies the location of the operation in the resource queue. That is, the resource queue is sequentially ranked in the order that requests arrive at the resource. The system 300 includes a take-two bit module 320 for each of the queues. The take-two bit is used and can be associated with a queue to track whether a controller that is currently the head of a queue has already previously reset its needs register followed by entering the central pipeline but was unsuccessful in acquiring the resource. By tracking whether the controller that is currently the head of queue has previously reset its needs register followed by entering the central pipeline and was unsuccessful and setting its needs register again (to indicate it is still head of queue), the system 300 can implement fairness among the plurality of queues and operation types without starving some queues storing the various operation types.

Figure 4:
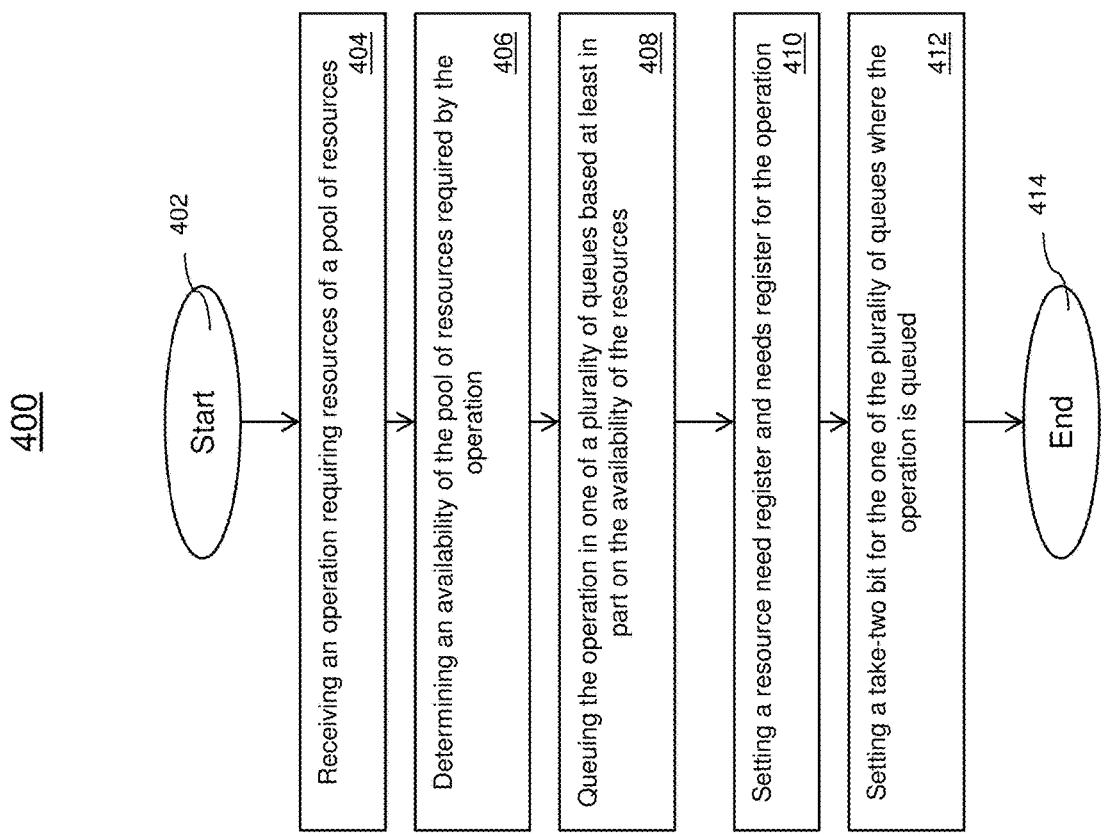
FIG. 4 depicts a flowchart for a method in accordance with one or more embodiments of the invention.

Now referring to FIG. 4, a method 400 for modifying the central serialization of requests in SMP in accordance with one or more embodiments of the invention is shown. The method 400 begins at block 402 and continues to block 404 which provides for receiving an operation requiring resources from a pool of resources. In one scenario, if no queue has the "take-two" bit set, any queue's head-of-queue is allowed to reset their needs register immediately and re-enter the central pipeline to attempt to acquire the targeted resource. In some embodiments of the invention, there is no attempt to control the order of which operation enters the central pipeline first. Depending on the number of copies of the resources that are currently available, either one or multiple queues may be successful in acquiring the resource.

At block 406, the method 400 provides for determining the availability of the pool of resources required by the operation. The engine 308 can track the availability of the resources based on the operation-type and pool of resources. It should be understood the engine 308 can be configured to monitor local resources, remote resources, or a combination thereof. The method 400 proceed to block 408 and provides for selecting a queue of a plurality of queues to queue the operation based at least in part on the availability of the pool of resources. For example, the queue can be associated with an operation-type and the operation is stored at the bottom of the corresponding queue. Block 410 provides for setting a resource needs register and needs register for the selected queue. The resource needs register indicates a pool of resources that are required for the operation in the queue. The needs register identifies the location of the operation within the queue which can identify the head of the queue.

Block 412 provides for setting a take-two bit for the selected queue and the method 400 can end at block 414. The take-two bit is used and can be associated with a queue to track whether a controller that is currently the head of a queue has already previously reset its needs register followed by entering the central pipeline but was unsuccessful in acquiring the resource. This can result in the setting the needs register again to indicate it is still head of its queue. This allows the system 300 to provide a resource from a pool of resources when it is made available to the queue where the last operation was queued. Some embodiments of the process are further described below.

In some embodiments of the invention, the queue having the take-two bit set is the only queue of the plurality of queues that is allowed to provide its head-of-queue to the central pipe to obtain the resource. After the head-of-queue enters the central pipeline, the take-two bit is reset and the need register is reset.

In one or more embodiments of the invention, after the take-two bit is set and a plurality of operations or requests are received from a plurality of queues, when a resource becomes available, it is determined whether multiple queues have one or more operations that are targeting the available resource. The take-two bit for each of these queues is analyzed to determine which queue's head is allowed to reset its needs register and re-enter the central pipeline to attempt to acquire the resource.

The head-of-the-queue for a queue having its take-two bit is allowed to enter the central pipeline to obtain the available resource from the pool. That is, the head of the other competing queues that do not have the take-two bit set continue to wait until a new head of queue is established in a first queue where the "take-two" bit has been reset.

In this architecture, in embodiments with 2 fairness queues, the "take-two" bit cannot be simultaneously set for the first fairness queue and the second fairness queue. At least one queue's head is able to enter the central pipeline to acquire at least one resource from the pool of resources, and upon acquiring the resource(s) the take-two bit for the current queue is reset.

In the event the head-of-queue is unable to enter the central pipeline, the new operation can be placed at the bottom of one of multiple queues based on an operation-type in example. Each of the queues can be associated with various operation-types or priorities. In this case, the resource needs register is set to the appropriate value based on the requested operation type and the needs register is set to either the head of the queue (if there is no head) or to the controller ID that was previously the tail of the particular queue. The need register indicates the location in the queue for the operation.

In the event the head of a particular queue is unable to acquire the requested resources for the operation, the operation remains the head of its own queue and a "take-two" bit is set which indicates that it has made an unsuccessful attempt.

In one or more embodiments, when the resource becomes available and only one of the plurality of queues targeting it exists, the queue's head-of-queue is allowed to reset the associated needs register and re-enter the central pipeline and acquire the resource, regardless of the value of that queue's take-two bit.

Figure 5:
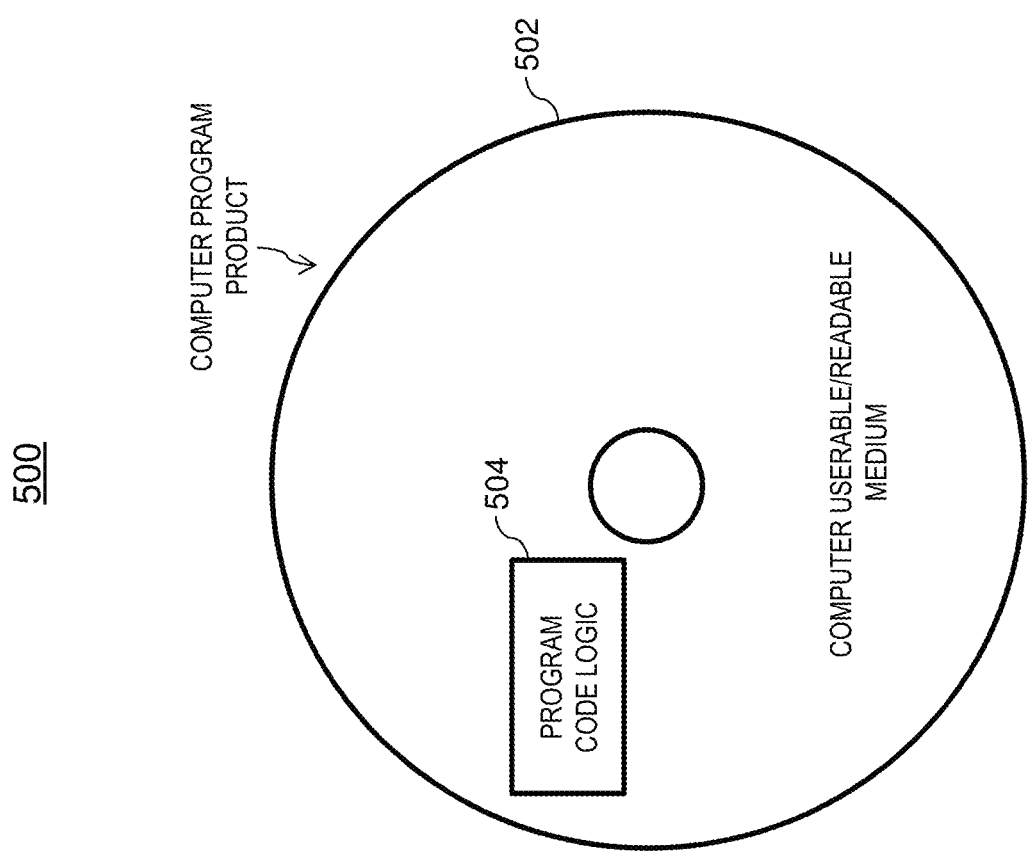
FIG. 5 depicts an article of manufacture incorporating one or more aspects of the exemplary embodiment.

Referring now to FIG. 5, a computer program product 500 in accordance with an embodiment that includes a computer-readable storage medium 502 and program instructions 504 is generally shown.

The techniques described herein provide a system and method for implementing an age-based fairness queue among different operation-types. This prevents the high priority tasks and operations from starving the low priority operations from accessing the limited resources. In existing solutions, the new operation that arrives and is unable to access the resource would be placed at the end of a particular queue to re-attempt to access the resource at a later time. This process occurs continuously until the resource becomes available. The queue storing similar operation-types can be starved for multiple cycles due to the resource being unavailable and the operation can be substantially delayed.

The technical effects and benefits include providing fair access to a limited system resource based on the relative age of the operations requesting the resource, as well as the type of operations requesting the resource. The techniques described herein balances the accessibility of a limited resource from the viewpoint by a central point in the system and prevents a burst of "lower-priority" class of operations from blocking "higher priority" operations from using the limited resource for long periods of time. The techniques described herein allow for fairness and flexibility among various operation-types and/or priorities to obtain the resource the available resources.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:
1. A computer-implemented method for modifying central serialization of requests in multiprocessor systems, the computer-implemented method comprising:
   receiving an operation requiring resources from a pool of resources;
   determining an availability of the pool of resources required by the operation;

selecting a queue of a plurality of queues to queue the operation based at least in part on the availability of the pool of resources;

subsequently receiving an operation from a head-of-queue of one of the plurality of queues;

determining an availability of the pool of resources;

examining a take-two bit for each of the plurality of queues;

allowing the subsequently received operation from the queue having the take-two bit set to enter a central pipeline based at least in part on the availability of the pool of resources and the take-two bit for the queue; and resetting the take-two bit to allow another queue of the plurality of queues an opportunity to enter the central pipeline.

2. The computer-implemented method of claim 1, wherein queuing the operation in one of the plurality of queues is based on an operation type.

3. The computer-implemented method of claim 1, wherein the take-two bit indicates a head-of queue for the queue has previously entered the central pipeline and was unsuccessful in acquiring the resource and subsequently set its needs register.

4. The computer-implemented method of claim 1, wherein the queue having the take-two bit set is an only queue having a head-of-queue that is allowed to enter the central pipe.

5. The computer-implemented method of claim 4, receiving a plurality of operations from a plurality of queues;
examining the take-two bit for each of the plurality of queues; and
allowing the head-of-queue from the queue having the take-two bit set to enter the queue.

6. The computer-implemented method of claim 1, wherein a needs register identifies the operation in the queue as a head-of-queue or a controller ID that was previously a tail of the queue.

7. A system for modifying central serialization of requests in multiprocessor systems, the system comprising:
a storage medium, the storage medium being coupled to a processor;
the processor configured to:
receive an operation requiring resources from a pool of resources;
determine an availability of the pool of resources required by the operation;
select a queue of a plurality of queues to queue the operation based at least in part on the availability of the pool of resources;
subsequently receive an operation from a head-of-queue of one of the plurality of queues;
determine an availability of the pool of resources;
examine a take-two bit for each of the plurality of queues;
allow the subsequently received operation from the queue having the take-two bit set to enter a central pipeline based at least in part on the availability of the pool of resources and the take-two bit for the queue; and
reset the take-two bit to allow another queue of the plurality of queues an opportunity to enter the central pipeline.

8. The system of claim 7, wherein queuing the operation in one of the plurality queues is based on an operation type.

9. The system of claim 7, wherein the take-two bit indicates the queue has previously entered the central pipeline and was unsuccessful in acquiring the resource and subsequently set its needs register.

10. The system of claim 7, wherein the queue having the take-two bit set is an only queue having a head-of-queue allowed to enter the central pipe.

11. The system of claim 10, receiving a plurality of operations from a plurality of queues;
examining the take-two bit for each of the plurality of queues; and
allowing the head-of-queue from the queue having the take-two bit set to enter the queue.

12. The system of claim 7, wherein a needs register identifies the operation in the queue as a head-of-queue or a controller ID that was previously a tail of the queue.

13. A computer program product for modifying central serialization of requests in multiprocessor systems, the computer program product comprising a computer-readable storage medium having program instructions embodied therewith, the program instructions executable by a processor to cause the processor to:
receive an operation requiring resources from a pool of resources;
determine an availability of the pool of resources required by the operation;
select a queue of a plurality of queues to queue the operation based at least in part on the availability of the pool of resources;
subsequently receive an operation from a head-of-queue of one of the plurality of queues;
determine an availability of the pool of resources;
examine a take-two bit for each of the plurality of queues;
allow the subsequently received operation from the queue having the take-two bit set to enter a central pipeline based at least in part on the availability of the pool of resources and the take-two bit for the queue; and
reset the take-two bit to allow another queue of the plurality of queues an opportunity to enter the central pipeline.

14. The computer program product of claim 13, wherein the instructions are further executable by the processor to cause the processor to queue the operation in one of the plurality queues is based on an operation type.

15. The computer program product of claim 13, wherein the take-two bit indicates the queue has previously entered the central pipeline and was unsuccessful in acquiring the resource and subsequently set its needs register.

16. The computer program product of claim 13, wherein the queue having the take-two bit set is an only queue having a head-of-queue allowed to enter the central pipe.

17. The computer program product of claim 16, wherein the instructions are further executable by the processor to cause the processor to receive a plurality of operations from a plurality of queues;
examine the take-two bit for each of the plurality of queues; and
allow the head-of-queue from the queue having the take-two bit set to enter the queue.

* * * * *